J. H. SIMKINS.
Marking Attachment for Corn-Planter.
No. 215,684. Patented May 20, 1879.
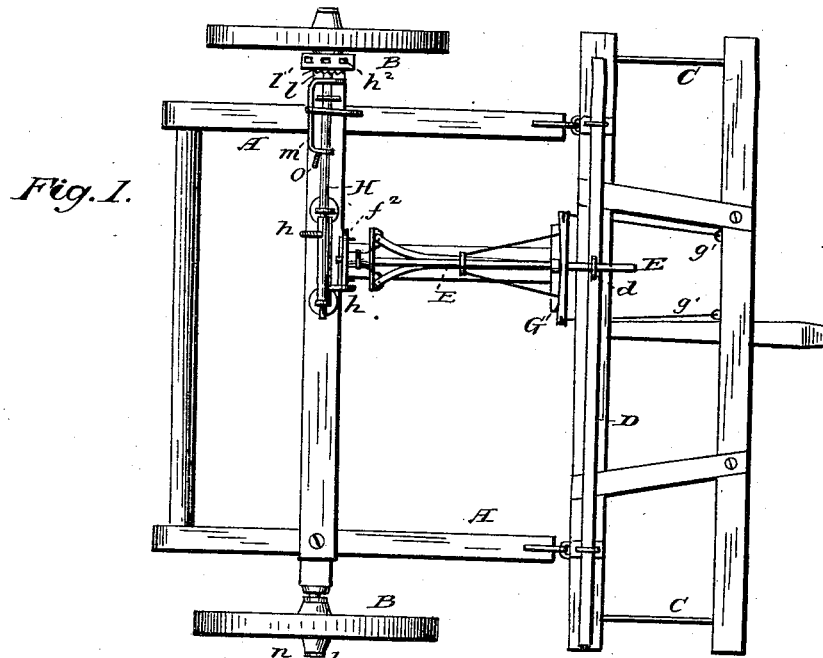
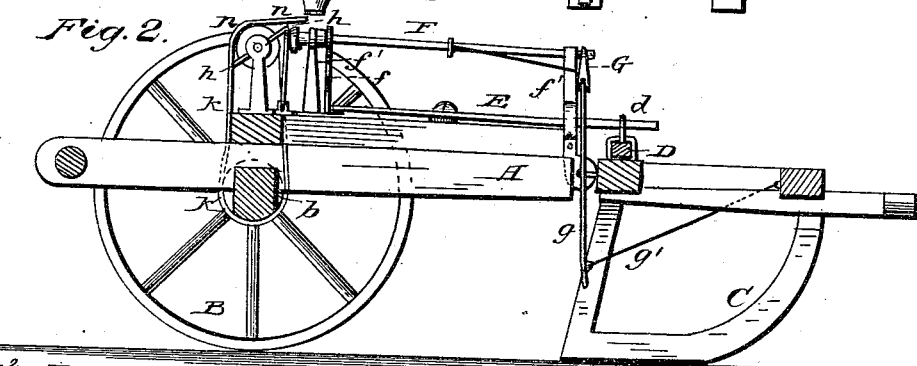
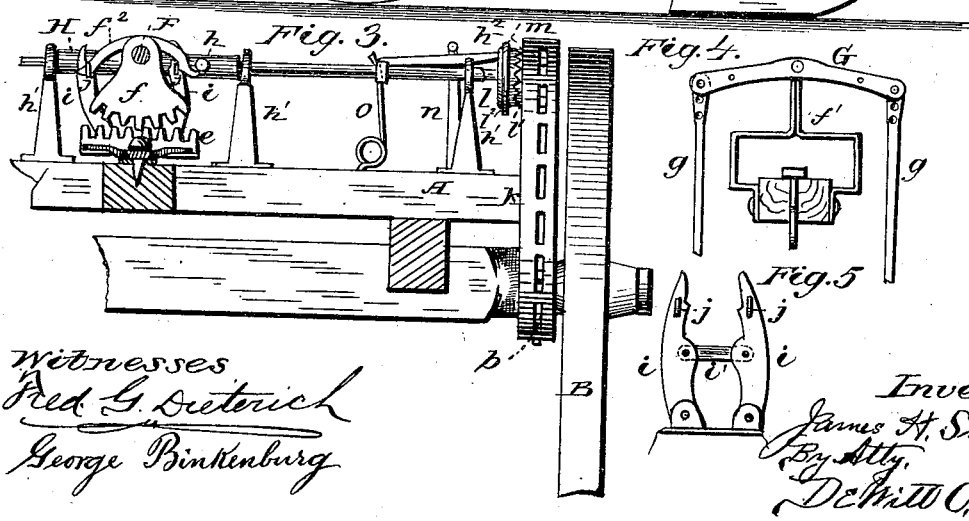
Witnesses
Fred G. Dieterich
George Binkenburg
Inventor
James H. Simkins
By Atty.
DeWitt C. Allen

UNITED STATES PATENT OFFICE.

JAMES H. SIMKINS, OF HEYWORTH, ILLINOIS.

IMPROVEMENT IN MARKING ATTACHMENTS FOR CORN-PLANTERS.

Specification forming part of Letters Patent No. 215,684, dated May 20, 1879; application filed March 29, 1879.

*To all whom it may concern:*

Be it known that I, JAMES H. SIMKINS, of Heyworth, in the county of McLean, and in the State of Illinois, have invented certain new and useful Improvements in Marking Attachments for Corn-Planters; and do hereby declare that the following is a full, clear, and exact description thereof, reference being had to the accompanying drawings, and to the letters of reference marked thereon, making a part of this specification, and in which—

Figure 1 is a plan view of a corn-planting machine embodying my improved marking attachment. Fig. 2 is a longitudinal sectional view, and Fig. 3 is a sectional front view, of the same. Figs. 4 and 5 are detail views.

This invention relates to new and useful improvements in the class of marking or check-row attachments for corn-planting machines, my invention having for its object the production of a marking or check-row attachment which, while being simple in construction and effective in operation, can be readily applied to the ordinary corn-planters; and to this end the invention consists in the general construction and combination of parts, all as will be hereinafter fully described, and specifically pointed out in the claims.

To enable others skilled in the art to make and use my invention, I will now proceed to describe the exact manner in which it is carried out.

In the drawings, A represents the usual horizontal main frame of a corn-planting machine principally supported by the carrying-wheels B B, and having pivoted to the front end thereof the frame of the usual furrow-openers or runners C C, and upon which are to be provided the usual seed-boxes arranged thereon, so that the seed can be discharged through the vertical portions of the runners into the furrows formed by said runners, in the usual and well-known manner.

D represents the usual transverse seed-slide, by which the seed is dropped at intervals from the hoppers into the heels of the runners, and which receives a transverse reciprocating movement through the medium of a vibrating arm or lever E, pivoted to the main frame A, and having its front end passing through a staple, $d$, on the seed-slide. This lever E is provided on its rear end with a transverse rack, $e$, with which a segmental gear, $f$, mounted on a rocking or vibratory shaft, F, engages, and through the medium of which the arm or lever E is vibrated.

The shaft F is journaled in the vertical standards $f^1 f^1$, and upon the front end of the shaft is centrally secured a transverse bar, G, having forked or slotted ends, in which are pivoted pendent marking-arms $g\ g$, said arms being alternately brought in contact with the ground when the shaft receives a rocking or vibrating movement. These marking-arms are arranged directly on a line with the heels of the runners C, and each of said arms is held in place while the other is lowered by the brace-arms $g'\ g'$, pivoted or hinged to the front cross-bar of the frame of the runners, and to the marking-arms near their lower ends, all as clearly shown in Figs. 1 and 2.

Centrally mounted or secured upon the rear end of the shaft F is a curved transverse bar, $f^2$, with which pins $h$, arranged on a transverse revolving shaft, H, alternately engage, and by means of which the shaft F is rocked or vibrated in its bearings, and through the medium of which the marking-arms $g$ and lever E, that moves the seed-slide, are simultaneously operated, thus causing the marking or indentation of the ground to be simultaneous with the dropping of the seed by the movement of the seed-slide.

The shaft F is limited in its vibrating or rocking movement by the arms $i\ i$, pivoted in supports attached to the main frame, said arms being connected together near the center by a link, $i'$, and extending up on opposite sides of the shaft, as clearly shown in Figs. 3 and 5. Each of said arms is provided on its front face with a projecting stud or pin, $j$, with which the ends of the curved bar $f^2$ engage alternately as the shaft F is rocked or vibrated in its bearings, thus throwing the upper ends of the arms $i\ i$ alternately against the shaft F, thereby limiting the rocking or vibrating movement of the shaft.

The shaft H is journaled in the upper end of the vertical standards $h^1$, secured to the cross-bar of the frame A, and has loosely mounted on its outer end a sprocket-wheel, $h^2$, and motion is communicated to said wheel by an endless chain or band, $k$, passing around said wheel and a similar wheel, $b$, mounted on the hub of one of the carrying or supporting wheels B.

Upon the shaft H is mounted a clutch, $l$, which engages with a similar clutch, $l^1$, on the sprocket-wheel $h^2$. The clutch $l$ is provided with a groove, $l^2$, extending around its periphery, in which one end of a rod, $m$, is secured. This rod $m$ extends along parallel with the shaft H, and has its other end bent at right angles, and loosely encircles said shaft, so as to slide freely thereon. $n$ represents a bent lever pivoted to the main frame for operating the rod $m$, by which the clutch $l$ can be thrown in and out of contact with the clutch $l^1$, for the purpose of disconnecting the operating mechanism from the driving mechanism. A spring, $o$, engaging with the rod $m$, keeps the clutch mechanism always in gear, except when thrown out by the pivoted lever $n$.

The parts being properly adjusted, the rotation of the wheel B operates, through the sprocket-wheels and endless chain or band, to rotate the shaft H, and consequently, through the intermediate mechanism before described, works the seed-slide and marking-arms, the hills of corn coming on a line with the end and beginning of each marked space.

Having thus fully described my invention, what I claim as new, and desire to secure by Letters Patent, is—

1. In a corn-planter, the combination of a longitudinal pivoted lever for operating the seed-slide, a longitudinal rocking or vibrating shaft provided with a transverse bar having dendent marking-arms, and intermediate connecting mechanism, whereby the lever is simultaneously operated with and through the medium of said rocking or vibrating shaft, substantially as and for the purpose specified.

2. In a corn-planter, the combination of the pivoted lever for operating the seed-slide, provided with the transverse rack $e$, and the vibrating or rocking shaft F, provided with a segmental gear engaging with said rack, substantially as and for the purpose herein shown and described.

3. In a corn-planter, the combination of shaft F, provided with the transverse bar G, having pendent marking-arms $g\ g$, and the curved or bent transverse rod $f^2$, with a revolving shaft arranged at right angles with the shaft F, and provided with pins $h$, that alternately engage with the opposite ends of said rod, substantially as and for the purpose herein shown and described.

4. In a corn-planter, the combination of the vibrating or rocking shaft F, provided with the transverse rod $f^2$, and the vertical pivoted arms $i\ i$, connected by a link, $i'$, and provided with the projecting studs or pins $j$, with which the ends of the rods $f^2$ alternately engage, substantially as and for the purpose herein shown and described.

In testimony that I claim the foregoing I have hereunto set my hand this 11th day of March, 1879.

JAMES H. SIMKINS.

Witnesses:
THOS. SLADE,
C. J. STRONG.